US012580134B2

(12) United States Patent　　　　　(10) Patent No.:　US 12,580,134 B2
Tanaka et al.　　　　　　　　　　　　(45) Date of Patent:　　Mar. 17, 2026

(54) ELECTROLYTIC CAPACITOR ELEMENT HAVING A DOPED SOLID ELECTROLYTE LAYER

(71) Applicant: Murata Manufacturing Co., Ltd., Nagaokakyo (JP)

(72) Inventors: Yasuo Tanaka, Nagaokakyo (JP); Keiji Yoshida, Nagaokakyo (JP)

(73) Assignee: MURATA MANUFACTURING CO., LTD., Nagaokakyo (JP)

( * ) Notice:　Subject to any disclaimer, the term of this patent is extended or adjusted under 35 U.S.C. 154(b) by 105 days.

(21) Appl. No.: 18/664,550

(22) Filed:　May 15, 2024

(65)　　　　　Prior Publication Data

US 2024/0296997 A1　　Sep. 5, 2024

Related U.S. Application Data

(63) Continuation of application No. PCT/JP2022/040754, filed on Oct. 31, 2022.

(30)　　Foreign Application Priority Data

Nov. 17, 2021　(JP) ................................. 2021-187123

(51) Int. Cl.
　　*H01G 9/028*　　　(2006.01)
　　*H01G 9/15*　　　　(2006.01)
　　*H01G 9/055*　　　(2006.01)
(52) U.S. Cl.
　　CPC .............. *H01G 9/028* (2013.01); *H01G 9/15* (2013.01); *H01G 9/055* (2013.01)

(58) Field of Classification Search
None
See application file for complete search history.

(56)　　　　　References Cited

U.S. PATENT DOCUMENTS

| | | | |
|---|---|---|---|
| 9,318,268 B2 | 4/2016 | Onoue et al. | |
| 10,325,728 B2 | 6/2019 | Uka et al. | |

(Continued)

FOREIGN PATENT DOCUMENTS

| | | |
|---|---|---|
| JP | 2008-078641 A | 4/2008 |
| JP | 2008-135444 A | 6/2008 |

(Continued)

OTHER PUBLICATIONS

International Search Report received for PCT Patent Application No. PCT/JP2022/040754, mailed on Jan. 31, 2023, 2 pages.

*Primary Examiner* — Eric W Thomas
(74) *Attorney, Agent, or Firm* — ArentFox Schiff LLP

(57)　　　　　ABSTRACT

An electrolytic capacitor element that includes: an anode having a front end face and a base end face; a dielectric layer on at least one main face of the anode but excluding the base end face; a mask layer on the dielectric layer adjacent the base end face; and a cathode on the dielectric layer on the front end face side from the mask layer, wherein the cathode includes a solid electrolyte layer and a conductive layer, the solid electrolyte layer includes a first layer including a first conductive polymer doped with a first dopant and a second layer including a second conductive polymer doped with a second dopant, the second layer is partially disposed in the plane of the solid electrolyte layer, and the second conductive polymer is more likely to be dedoped than the first conductive polymer.

15 Claims, 8 Drawing Sheets

(56)             References Cited

U.S. PATENT DOCUMENTS

2010/0172068 A1\*   7/2010  Yoshimitsu ............. H01G 9/15
                                                427/80
2014/0055912 A1   2/2014  Onoue et al.
2018/0047513 A1   2/2018  Uka et al.

FOREIGN PATENT DOCUMENTS

JP        2008-186841 A       8/2008
JP        2010-109265 A       5/2010
JP        2010-278033 A      12/2010
JP        2012-182226 A       9/2012
JP        2014-041933 A       3/2014
JP        2018-129437 A       8/2018
JP        2018-198298 A      12/2018
WO    WO-2006075551 A1 \*  7/2006  ............ H01G 9/028
WO        2016/174818 A1     11/2016

\* cited by examiner

ELECTROLYTIC CAPACITOR ELEMENT HAVING A DOPED SOLID ELECTROLYTE LAYER

CROSS REFERENCE TO RELATED APPLICATIONS

The present application is a continuation of International application No. PCT/JP2022/040754, filed Oct. 31, 2022, which claims priority to Japanese Patent Application No. 2021-187123, filed Nov. 17, 2021, the entire contents of each of which are incorporated herein by reference.

TECHNICAL FIELD

The present description relates to an electrolytic capacitor element.

BACKGROUND ART

Patent Literature 1 discloses a solid electrolytic capacitor including a first oxide dielectric layer formed on the face of an anode body, a second oxide dielectric layer formed on an exposed end face formed by cutting the anode body, a first conductive polymer layer formed on the first oxide dielectric layer, and a second conductive polymer layer formed on the second oxide dielectric layer, and describes that the second conductive polymer layer is more likely to be insulated than the first conductive polymer layer.
Patent Literature 1: JP 2008-78641 A

SUMMARY OF THE DESCRIPTION

In Patent Literature 1, the second conductive polymer layer is insulated by covering the second oxide dielectric layer having a low withstand voltage and formed on the cut face of the anode body with the second conductive polymer layer, and thus it is possible to provide the solid electrolytic capacitor having a low leakage current defective rate without a decrease in capacitance. However, the mechanism of insulation is not clear, and the addition of an insulating binder is a measure for easily insulating the second conductive polymer layer, so that there is room for improvement in that the conductivity of the entire second conductive polymer layer decreases, leading to an increase in equivalent series resistance (ESR). There is room for further study in that the leakage current is not sufficiently reduced because a portion where an electric field is likely to be concentrated when applying a voltage, for example, a corner portion is not covered with the second conductive polymer layer.

The present description has been made to solve the above problems, and an object of the present description is to provide an electrolytic capacitor element capable of suppressing a leakage current while suppressing an increase in equivalent series resistance.

An electrolytic capacitor element of the present description includes: an anode including a valve acting metal substrate and having a front end face and a base end face; a dielectric layer on at least one main face of the anode but excluding at least the base end face; a mask layer including an insulating material on the dielectric layer adjacent the base end face; and a cathode on the dielectric layer on the front end face side from the mask layer, wherein the cathode includes a solid electrolyte layer on the dielectric layer and a conductive layer on the solid electrolyte layer, the solid electrolyte layer includes a first layer including a first conductive polymer doped with a first dopant and a second layer including a second conductive polymer doped with a second dopant, the second layer is partially disposed in a plane of the solid electrolyte layer, the first layer is disposed at least in a region in which the second layer is not disposed in the plane of the solid electrolyte layer, and the second conductive polymer is more likely to be dedoped than the first conductive polymer.

According to the present description, it is possible to provide the electrolytic capacitor element capable of suppressing the leakage current while suppressing the increase in the equivalent series resistance.

DESCRIPTION OF THE PREFERRED EMBODIMENTS

Hereinafter, an electrolytic capacitor element of the present description will be described.

However, the present description is not limited to the following embodiments, and can be appropriately modified and applied without changing the gist of the present description. The present description also includes a combination of two or more of individual desirable embodiments described below.

It should be understood that embodiments described below are merely examples, and embodiments described in different embodiments can be partially replaced or combined with each other. In the multiple embodiments, description of matters common among the embodiments are omitted, and only different points are described.

[Electrolytic Capacitor Element]

Figure 1:
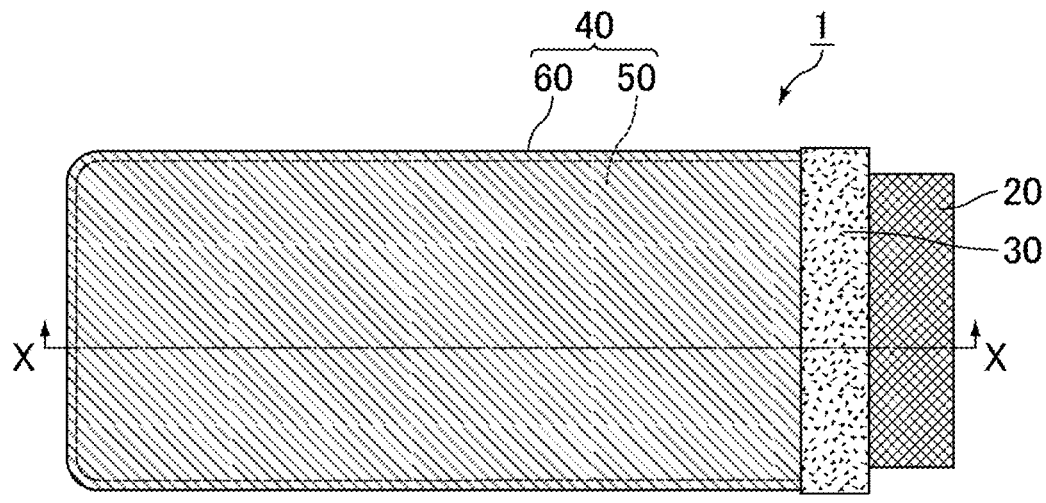
FIG. 1 is a plan view schematically illustrating an example of an electrolytic capacitor element according to an embodiment of the present description.
Figure 2:
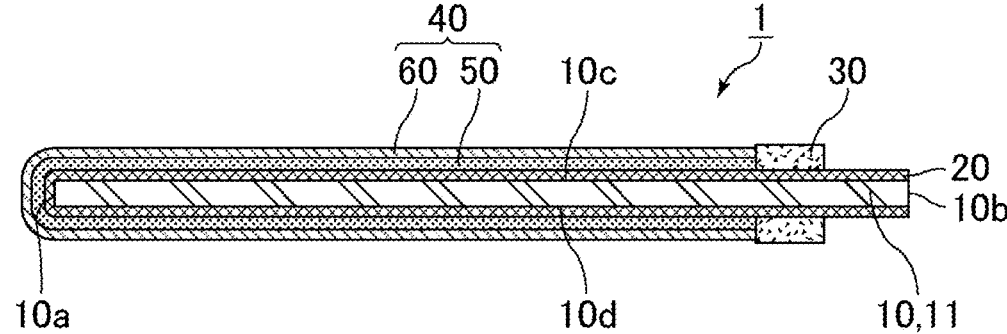
FIG. 2 is a cross-sectional view taken along line X-X of the electrolytic capacitor element illustrated in FIG. 1.

FIG. 1 is a plan view schematically illustrating an example of an electrolytic capacitor element according to an embodiment of the present description. FIG. 2 is a cross-sectional view taken along line X-X of the electrolytic capacitor element illustrated in FIG. 1. In FIG. 1, a solid electrolyte layer 50 covered with a conductive layer 60 is indicated by a broken line. In FIG. 1 and FIG. 2, the solid electrolyte layer 50 is illustrated without distinguishing a first layer 51 and a second layer 52.

An electrolytic capacitor element 1 illustrated in FIG. 1 and FIG. 2 is a solid electrolyte capacitor element, and includes an anode 10 including a valve acting metal substrate 11 and having a front end face 10*a* and a base end face 10*b*, a dielectric layer 20 provided on the surface of the anode 10 but excluding the base end face 10*b*, a mask layer 30 including an insulating material and provided on the dielectric layer 20 adjacent the base end face 10*b*, and a cathode 40 provided on the dielectric layer 20 on the front end face 10*a* side from the mask layer 30, in which the cathode 40 includes the solid electrolyte layer 50 provided on the dielectric layer 20 and the conductive layer 60 provided on the solid electrolyte layer 50.

Figure 3:
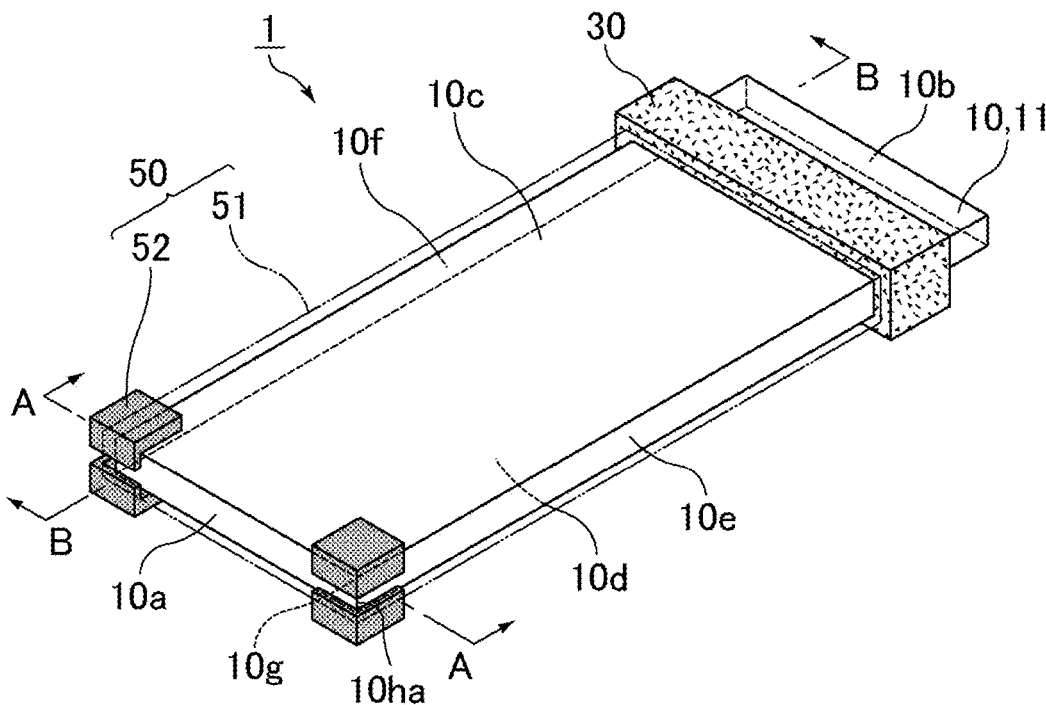
FIG. 3 is a perspective view of the electrolytic capacitor element illustrated in FIG. 1.
Figure 4:
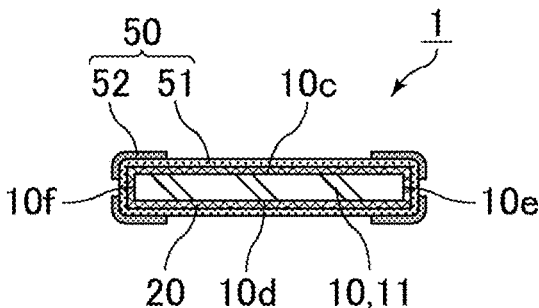
FIG. 4 is a cross-sectional view taken along line A-A of the electrolytic capacitor element illustrated in FIG. 3.
Figure 5:
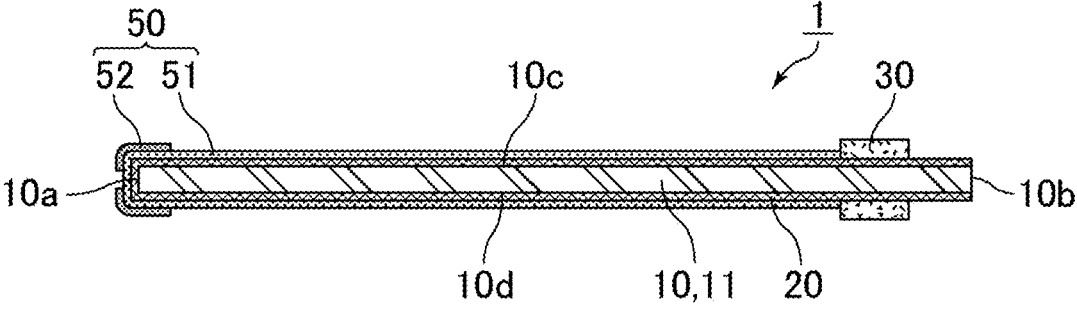
FIG. 5 is a cross-sectional view taken along line B-B of the electrolytic capacitor element illustrated in FIG. 3.

FIG. 3 is a perspective view of the electrolytic capacitor element illustrated in FIG. 1. FIG. 4 is a cross-sectional view taken along line A-A of the electrolytic capacitor element illustrated in FIG. 3. FIG. 5 is a cross-sectional view taken along line B-B of the electrolytic capacitor element illustrated in FIG. 3. FIG. 3, FIG. 4, and FIG. 5 illustrate a state before the conductive layer 60 of the cathode 40 is formed. In FIG. 3, the dielectric layer 20 is not illustrated, and the first layer 51 of the solid electrolyte layer 50 is indicated by a dash-dot line, and the first layer 51 is seen through.

As shown in FIG. 3, FIG. 4, and FIG. 5, the solid electrolyte layer 50 includes the first layer 51 including a first conductive polymer doped with a first dopant and the second layer 52 including a second conductive polymer doped with a second dopant, the second layer 52 is partially disposed in the plane of the solid electrolyte layer 50, and the first layer 51 is disposed at least in a region where the second layer 52 is not disposed in the plane of the solid electrolyte layer 50. The second conductive polymer is more likely to be dedoped than the first conductive polymer.

Accordingly, it is possible to suppress a leakage current while suppressing an increase in equivalent series resistance of the electrolytic capacitor element 1. The reason (the action) for obtaining such an effect is considered as follows.

That is, it is considered that the dedoping of a conductive polymer locally occurs at a location where the leakage current occurs, and the conductive polymer can be insulated. In the electrolytic capacitor element 1, the second layer 52 including the second conductive polymer which is likely to be dedoped is partially disposed in the plane of the solid electrolyte layer 50, so that the second layer 52 can be selectively disposed at the location where the leakage current is likely to occur, and as a result thereof, the leakage current is suppressed by the insulation of the second conductive polymer. That is, the second layer 52 may function as a local self-healing layer. On the other hand, the conductive polymer which is generally likely to be dedoped is relatively poor in conductivity, and therefore tends to cause the increase in the equivalent series resistance of the electrolytic capacitor element. However, in the electrolytic capacitor element 1, the second layer 52 that may cause the increase in the equivalent series resistance is partially disposed in the plane of the solid electrolyte layer 50, and on the other hand, the first layer 51 including the first conductive polymer that is relatively less likely to be dedoped than the second conductive polymer, that is, capable of suppressing the increase in the equivalent series resistance, is disposed at least in the region where the second layer 52 is not disposed in the plane of the solid electrolyte layer 50, so that the increase in the equivalent series resistance of the entire electrolytic capacitor element 1 is prevented. As described above, it is considered that the leakage current can be reduced without increasing the equivalent series resistance of the entire electrolytic capacitor element 1.

Here, "The second conductive polymer is more likely to be dedoped than the first conductive polymer" represents that a bonding force between a second main chain of the second conductive polymer and the second dopant is smaller than a bonding force between a first main chain of the first conductive polymer and the first dopant.

Regarding the mechanism of the occurrence of the dedoping of the conductive polymer due to the leakage current, it is considered that electrical coupling between the main chain of the conductive polymer and the dopant is inhibited due to the occurrence of the leakage current, or the dedoping occurs by causing the thermal motion of the dopant by Joule heat generated when the leakage current flows through the conductive polymer.

Only from the viewpoint of preventing the leakage current, it is considered to dispose only the second conductive polymer, which is likely to be dedoped, in the entire plane of the solid electrolyte layer 50, but in this case, there is a possibility that the conductivity of the entire solid electrolyte layer 50 decreases, leading to the increase in the equivalent series resistance of the electrolytic capacitor element 1. Since the conductive polymer which is likely to be dedoped generally tends to be poor in heat resistance, there is a possibility that the high-temperature reliability of the electrolytic capacitor element 1 has deteriorated in a case where only the second conductive polymer which is likely to be dedoped is disposed in the entire plane of the solid electrolyte layer 50.

As described above, in the present specification, the "conductive polymer" includes the main chain and the dopant. That is, the first conductive polymer includes a first main chain and a first dopant, and the second conductive polymer includes a second main chain and a second dopant.

As shown in FIG. 3, FIG. 4, and FIG. 5, the anode 10 includes six faces of the front end face 10*a*, the base end face 10*b*, a pair of main faces 10*c* and 10*d*, and a pair of side faces 10*e* and 10*f*, and includes a corner portion where three faces of the six faces intersect each other, and a ridge portion where two faces of the six faces intersect each other, and the second layer 52 covers each of the corner portions 10*g* by the front end face 10*a*. In general, a leakage current is likely to occur in the corner portion of the anode, so that the leakage current can be more effectively suppressed.

Figure 6:
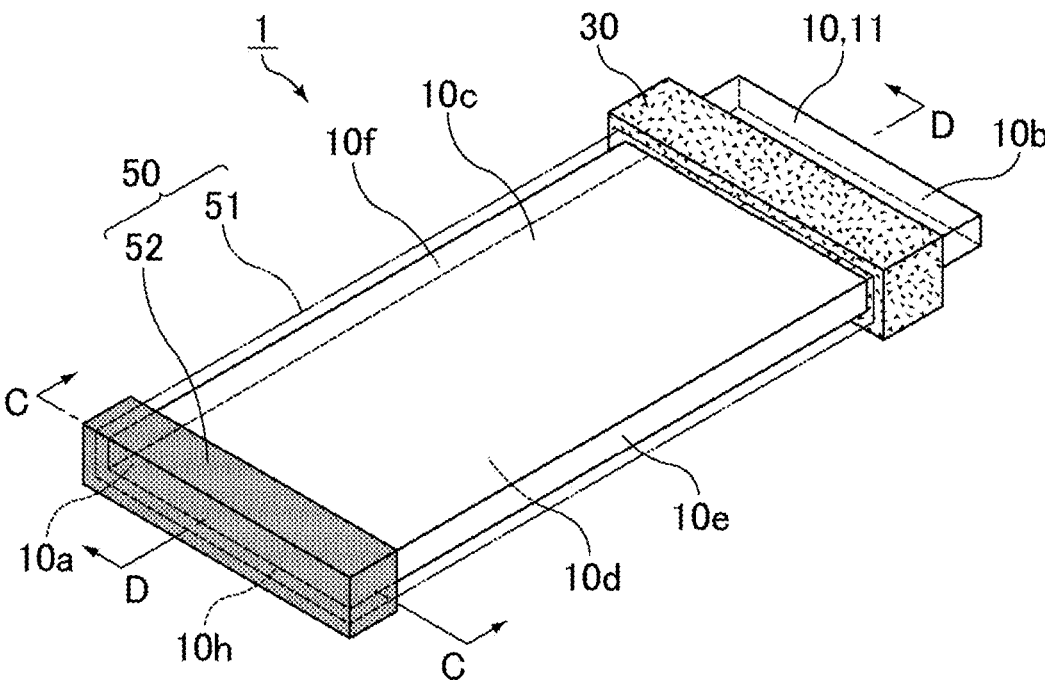
FIG. 6 is a perspective view schematically illustrating an example of an electrolytic capacitor element according to another embodiment of the present description.
Figure 7:
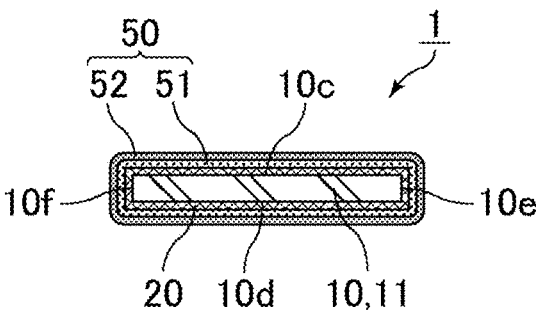
FIG. 7 is a cross-sectional view taken along line C-C of the electrolytic capacitor element illustrated in FIG. 6.
Figure 8:
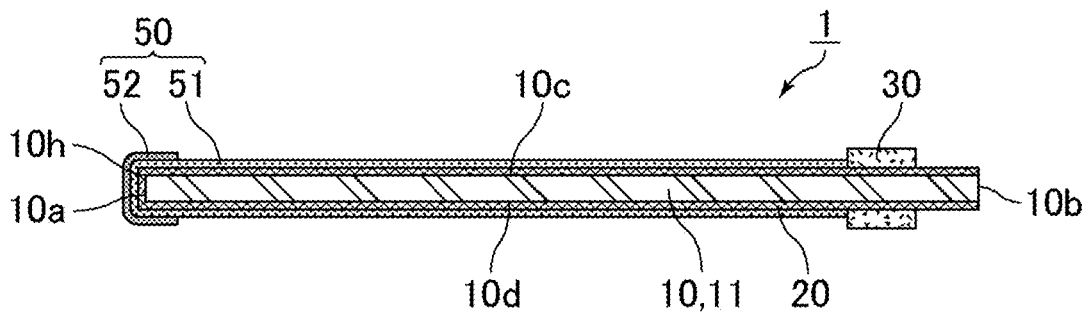
FIG. 8 is a cross-sectional view taken along line D-D of the electrolytic capacitor element illustrated in FIG. 6.

FIG. 6 is a perspective view schematically illustrating an example of an electrolytic capacitor element according to another embodiment of the present description. FIG. 7 is a cross-sectional view taken along line C-C of the electrolytic capacitor element illustrated in FIG. 6. FIG. 8 is a cross-sectional view taken along line D-D of the electrolytic capacitor element illustrated in FIG. 6. FIG. 6, FIG. 7, and FIG. 8 illustrate a state before the conductive layer 60 of the cathode 40 is formed. In FIG. 6, the dielectric layer 20 is not illustrated, and the first layer 51 of the solid electrolyte layer 50 is indicated by a dash-dot line, and the first layer 51 is seen through.

As illustrated in FIG. 6, FIG. 7, and FIG. 8, the second layer 52 may further cover the front end face 10a and each ridge portion 10h formed by the front end face 10a. In general, since the leakage current is likely to occur even in the ridge portion of the anode, the leakage current can be more effectively suppressed. The second layer 52 is more easily formed in the case illustrated in FIG. 3 than in the case illustrated in FIG. 6.

In the present specification, the corner portion is a portion where three faces intersect each other, and the ridge portion is a portion where two faces intersect each other. A corner portion by a certain face means a corner portion where three faces including the certain face intersect each other, and a ridge portion by a certain face means a ridge portion where two faces including the certain face intersect each other.

Figure 9:
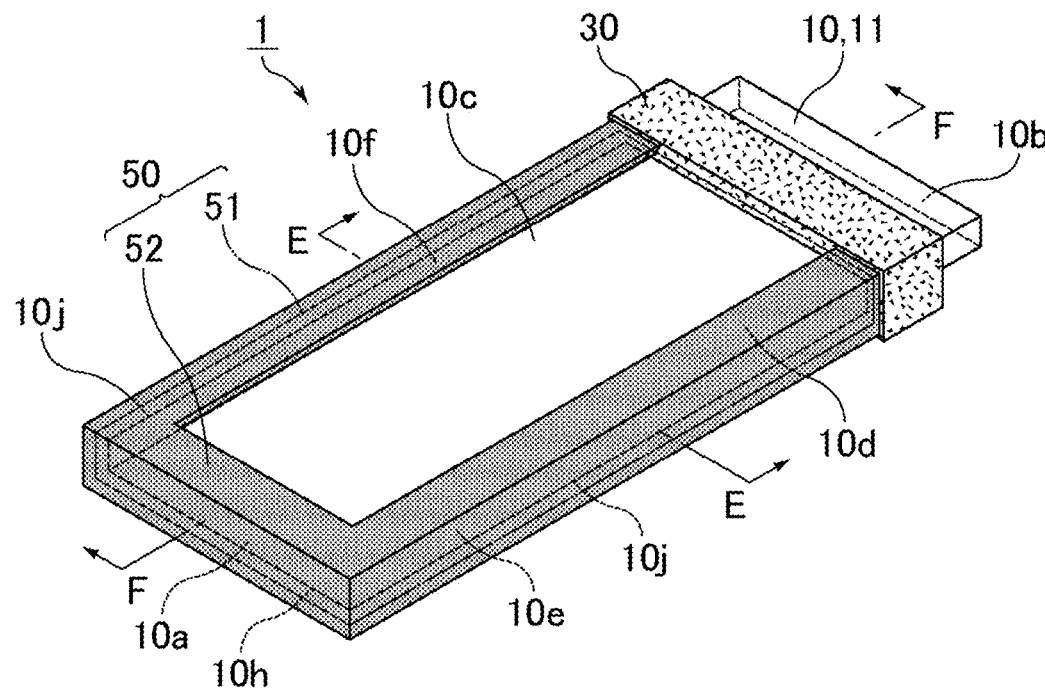
FIG. 9 is a perspective view schematically illustrating an example of an electrolytic capacitor element according to still another embodiment of the present description.
Figure 10:
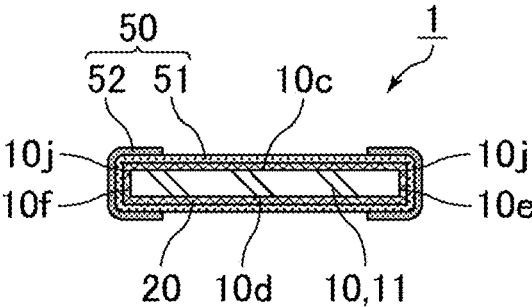
FIG. 10 is a cross-sectional view taken along line E-E of the electrolytic capacitor element illustrated in FIG. 9.
Figure 11:
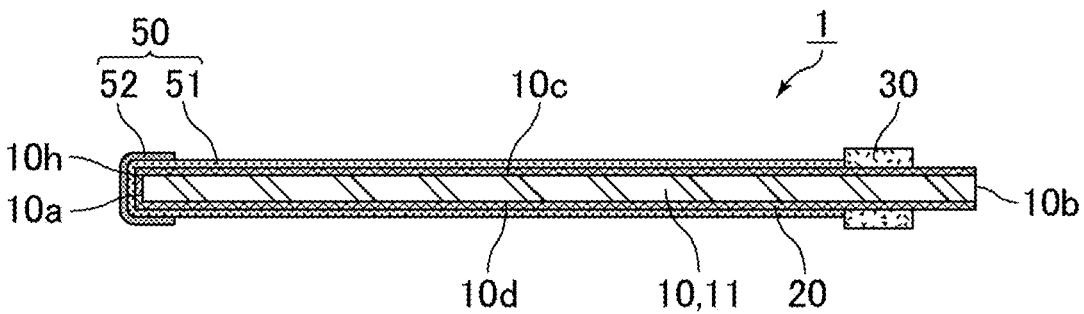
FIG. 11 is a cross-sectional view taken along line F-F of the electrolytic capacitor element illustrated in FIG. 9.

FIG. 9 is a cross-sectional view schematically illustrating an example of an electrolytic capacitor element according to still another embodiment of the present description. FIG. 10 is a cross-sectional view taken along line E-E of the electrolytic capacitor element illustrated in FIG. 9. FIG. 11 is a cross-sectional view taken along line F-F of the electrolytic capacitor element illustrated in FIG. 9. FIG. 9, FIG. 10, and FIG. 11 illustrate a state before the conductive layer 60 of the cathode 40 is formed. In FIG. 9, the dielectric layer 20 is not illustrated, and the first layer 51 of the solid electrolyte layer 50 is indicated by a dash-dot line, and the first layer 51 is seen through.

As illustrated in FIG. 9, FIG. 10, and FIG. 11, the second layer 52 may further cover the side faces 10e and 10f and the ridge portions 10j formed by the side faces 10e and 10f. Accordingly, the leakage current can be particularly effectively suppressed.

Figure 12:
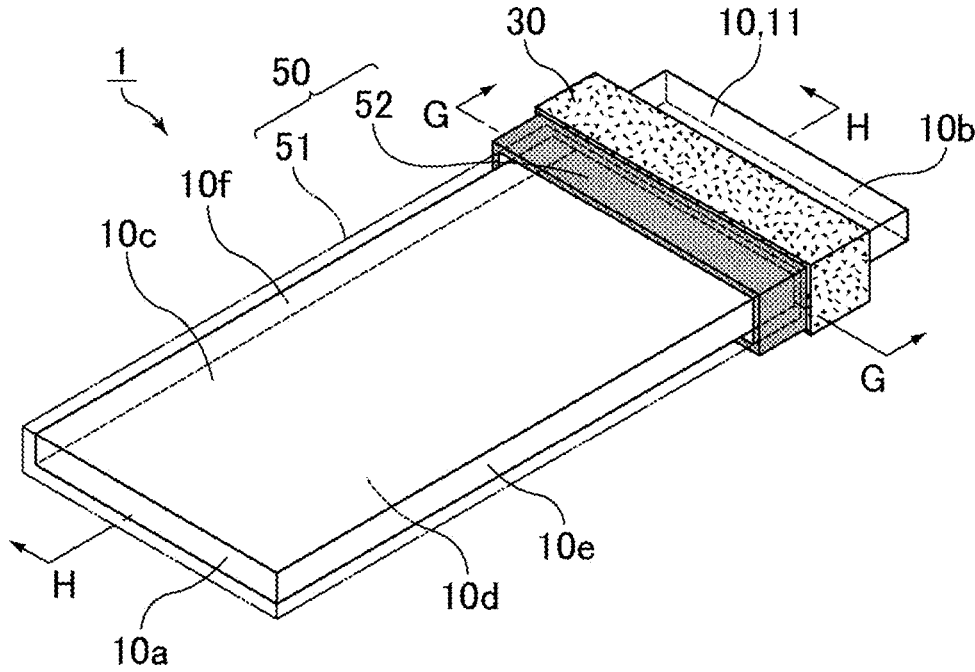
FIG. 12 is a perspective view schematically illustrating an example of an electrolytic capacitor element according to still another embodiment of the present description.
Figure 13:
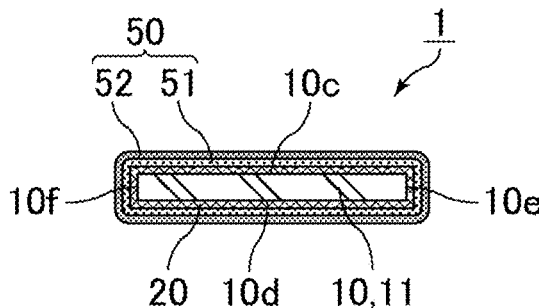
FIG. 13 is a cross-sectional view taken along line G-G of the electrolytic capacitor element illustrated in FIG. 12.
Figure 14:
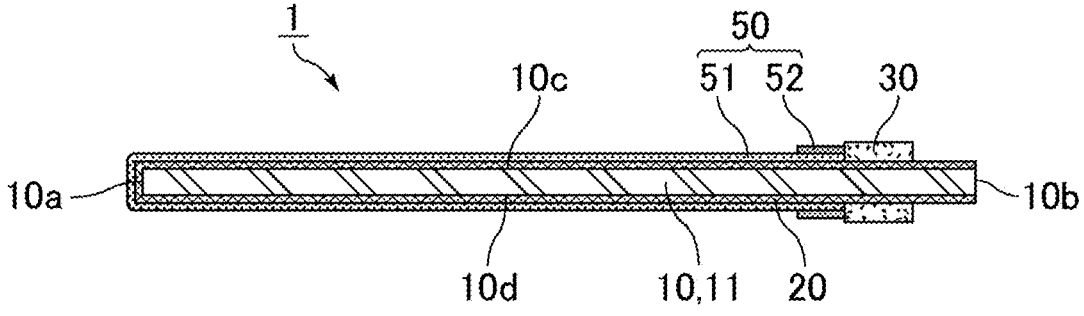
FIG. 14 is a cross-sectional view taken along line H-H of the electrolytic capacitor element illustrated in FIG. 12.

FIG. 12 is a cross-sectional view schematically illustrating an example of an electrolytic capacitor element according to still another embodiment of the present description. FIG. 13 is a cross-sectional view taken along line G-G of the electrolytic capacitor element illustrated in FIG. 12. FIG. 14 is a cross-sectional view taken along line H-H of the electrolytic capacitor element illustrated in FIG. 12. FIG. 12, FIG. 13, and FIG. 14 illustrate a state before the conductive layer 60 of the cathode 40 is formed. In FIG. 12, the dielectric layer 20 is not illustrated, and the first layer 51 of the solid electrolyte layer 50 is indicated by a dash-dot line, and the first layer 51 is seen through.

As illustrated in FIG. 12, FIG. 13, and FIG. 14, the second layer 52 may be disposed along the mask layer 30. The solid electrolyte layer becomes thin at a position along the mask layer, and as a result thereof, the leakage current may occur, but by disposing the second layer 52 along the mask layer 30, the leakage current at the position along the mask layer 30 can be effectively suppressed.

Although it is not illustrated, the second layer having both the structure illustrated in FIG. 3, FIG. 6, or FIG. 9 and the structure illustrated in FIG. 12 may be formed. That is, for example, by combining the structures illustrated in FIG. 6 and FIG. 12, the second layer 52 may be disposed along the mask layer 30 while covering each of the corner portions 10g by the front end face 10a, the front end face 10a, and each of the ridge portions 10h by the front end face 10a.

Hereinafter, each configuration of the electrolytic capacitor element 1 will be described in detail.

The anode 10 is a thin film (foil) including the valve acting metal substrate 11 and having a tetragonal shape in a plan view, preferably a rectangular (strip) shape with a pair of long sides and a pair of short sides in a plan view. The front end face 10a and the base end face 10b are end faces respectively on a pair of the sides (preferably, a pair of the short sides) of the anode 10, and the base end face 10b is an end face exposed without being covered with the dielectric layer 20, and exposed at one end face of the electrolytic capacitor to be connected to an external electrode described later. The anode 10 has the front end face 10a, the base end face 10b, the main faces 10c and 10d, and the side faces 10e and 10f.

Herein, the term "plan view" means a view in the direction of the normal of the main face of the anode (the valve acting metal substrate).

Figure 15:
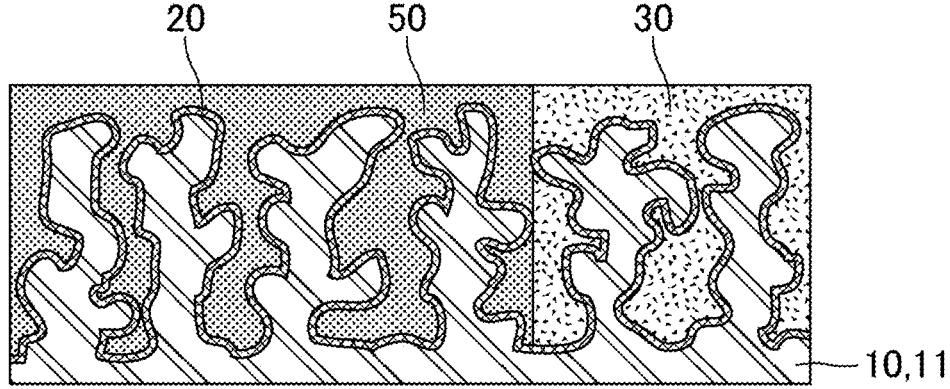
FIG. 15 is an enlarged cross-sectional view of a mask layer portion of the electrolytic capacitor element illustrated in FIG. 2.

FIG. 15 is an enlarged cross-sectional view of the mask layer portion of the electrolytic capacitor element illustrated in FIG. 2.

As illustrated in FIG. 15, a plurality of recesses are provided on each main face of the valve acting metal substrate 11 (the anode 10). Therefore, each main face of the valve acting metal substrate 11 is porous. Accordingly, the valve acting metal substrate 11 has a large surface area. The present description is not limited to a case where both main faces of the valve acting metal substrate 11 are porous, and only one of the main faces of the valve acting metal substrate 11 may be porous.

The valve acting metal substrate 11 is made of, for example, a valve acting metal such as a single metal, e.g., aluminum, tantalum, niobium, titanium, or zirconium, or an alloy containing these metals. An oxide film can be formed on the surface of the valve acting metal.

The valve acting metal substrate 11 only needs to include a core portion and a porous portion provided on at least one main face of the core portion, and for example, one obtained by etching the surface of a metal foil or one obtained by forming a porous fine powder sintered body on the surface of a metal foil can be appropriately used.

The dielectric layer 20 is provided on the surface of the anode 10 but excluding the base end face 10b. That is, the dielectric layer 20 is provided on the front end face 10a, main faces 10c and 10d, and side faces 10e and 10f of the anode 10 but is not provided on the base end face 10b of the anode 10.

It is sufficient that the dielectric layer 20 is provided on at least one of the main face 10c or 10d of the anode 10 but excluding at least the base end face 10b.

The dielectric layer 20 preferably includes an oxide film provided on the surface of the valve acting metal substrate 11. For example, the dielectric layer 20 includes an aluminum oxide. The aluminum oxide is formed by anodizing the surface of the valve acting metal substrate 11 as described later.

The mask layer 30 is a linear (extending in a belt-like shape) insulating member provided on the dielectric layer 20 adjacent the base end face 10b of the anode 10, preferably along the short side of the anode 10, and separates the anode 10 from the cathode 40 to ensure insulation between them. The mask layer 30 divides the anode 10 into a region on the base end face 10b side and a region on the front end face 10a side. The mask layer 30 is away at a predetermined distance from the base end face 10b but may extend to just before the edge of the base end face 10b. The mask layer 30 is provided on the main faces 10c and 10d and the side faces 10e and 10f of the anode 10 via the dielectric layer 20, and as with the dielectric layer 20, it is sufficient that the mask layer 30 is provided on at least one of the main face 10c or 10d (a main face on which the dielectric layer 20 is provided) of the anode 10.

As illustrated in FIG. 15, the mask layer 30 is preferably provided so as to fill a plurality of pores (recesses) of the valve acting metal substrate 11. Yet, it is sufficient that a part of the outer surface of the dielectric layer 20 is covered with the mask layer 30, and the pores (the recesses) of the valve acting metal substrate 11 not filled with the mask layer 30 may be present.

The mask layer 30 includes an insulating material. The mask layer 30 is formed, for example, by applying a mask material such as a composition containing an insulating resin. Examples of the insulating resin include polyphenyl sulfone (PPS), polyether sulfone (PES), a cyanate ester resin, a fluororesin (tetrafluoroethylene, tetrafluoroethylene-perfluoroalkyl vinyl ether copolymers, etc.), a composition containing a soluble polyimide siloxane and an epoxy resin, a polyimide resin, a polyamide imide resin, and derivatives or precursors thereof.

The mask material can be applied by, for example, a method such as screen printing, roller transfer, dispenser application, or inkjet printing.

The cathode 40 includes the solid electrolyte layer 50 provided on the dielectric layer 20 and the conductive layer 60 provided on the solid electrolyte layer 50. The cathode 40 is provided on the dielectric layer 20 on the front end face 10a side from the mask layer 30. That is, the cathode 40 is on the dielectric layer 20 in the region on the front end face 10a side of the anode 10 divided by the mask layer 30.

The solid electrolyte layer 50 is provided on the dielectric layer 20. As illustrated in FIG. 15, the solid electrolyte layer 50 is preferably provided so as to fill the plurality of pores (recesses) of the valve acting metal substrate 11. Yet, it is sufficient that a part of the outer surface of the dielectric layer 20 is covered with the solid electrolyte layer 50, and the pores (the recesses) of the valve acting metal substrate 11 not filled with the solid electrolyte layer 50 may be present.

The solid electrolyte layer 50 is provided on the dielectric layer 20 on the front end face 10a side from the mask layer 30. That is, the cathode 40 is on the dielectric layer 20 in the region on the front end face 10a side of the anode 10 divided by the mask layer 30.

As described above, the solid electrolyte layer 50 includes the first layer 51 including the first conductive polymer doped with the first dopant and the second layer 52 including the second conductive polymer doped with the second dopant.

The second layer 52 is disposed not in the entire region but only in a partial region in the plane of the solid electrolyte layer 50. That is, the second layer 52 is unevenly distributed not in the thickness direction but in the in-plane direction of the solid electrolyte layer 50.

On the other hand, the first layer 51 is disposed at least in a region where the second layer 52 is not disposed in the plane of the solid electrolyte layer 50. Therefore, at least one of the first layer 51 or the second layer 52 is disposed in the plane of the solid electrolyte layer 50.

Here, as illustrated, for example, in FIG. 3, the first layer 51 is disposed in the entire plane of the solid electrolyte layer 50, and the second layer 52 is provided on the first layer 51. That is, the second layer 52 is disposed only in a part of the region on the first layer 51.

The thickness of the first layer 51 is not limited, and may be, for example, approximately the same thickness as a general solid electrolyte layer. Specifically, the maximum thickness of the first layer 51 is preferably 2 μm to 50 μm, more preferably 3 μm to 40 μm, even more preferably 5 μm to 30 μm.

Specifically, the thickness of the second layer 52 is not also limited, but specifically, the maximum thickness of the second layer 52 is preferably 2 μm to 50 μm, more preferably 3 μm to 40 μm, even more preferably 5 μm to 30 μm.

A location where the second layer 52 is disposed can be appropriately set, but as described above, (1) a mode in which the second layer 52 covers each of the corner portions 10g of the anode 10 (refer to, for example, FIG. 3), (2) a mode in which the second layer 52 further covers the front end face 10a of the anode 10 and each of the ridge portions 10h by the front end face 10a (refer to, for example, FIG. 6), (3) a mode in which the second layer 52 further covers each of the side faces 10e and 10f of the anode 10 and each of the ridge portions 10j by each of the side faces 10e and 10f (refer to, for example, FIG. 9), and (4) a mode in which the second layer 52 is disposed along the mask layer 30 (refer to, for example, FIG. 12) are preferable.

In the case of (1), the second layer 52 may cover at least one of four corner portions 10g by the front end face 10a, and preferably covers each of the four corner portions 10g.

FIG. 3 illustrates a case where two corner portions 10g (the corner portions 10g arranged vertically in FIG. 3) by the same side face 10e or 10f are each independently covered with the second layer 52, but these two corner portions 10g may be integrally covered with the second layer 52. That is, four ridge portions 10h by the front end face 10a include two ridge portions 10ha by the side face 10e or 10f and the front end face 10a, and the second layer 52 may further cover the ridge portion 10ha.

In the case of (2), the second layer 52 may cover at least one of four ridge portions 10h by the front end face 10a, and preferably covers each of the four ridge portions 10h. As described above, the second layer 52 preferably covers the front end portion (a portion including the front end face 10a as a part) of the anode 10, and the second layer 52 is preferably provided from the front end face 10a to each of the main face 10c, the main face 10d, the side face 10e, and the side face 10f.

In the case of (3), the second layer 52 may cover at least one of two side faces 10e or 10f, and preferably covers the two side faces 10e and 10f, respectively. The second layer 52 may cover at least one of four ridge portions 10j by the side faces 10e and 10f, and preferably covers each of the four ridge portions 10j.

In this case, the second layer 52 may not cover the front end face 10a and each of the ridge portions 10h by the front end face 10a.

In the case of (4), the second layer 52 may be disposed along the mask layer 30 on at least one of the main faces 10c or 10d or the side faces 10e or 10f of the anode 10, and is preferably disposed along the mask layer 30 on each of these faces.

In this case, preferably no gap is provided between the second layer 52 and the mask layer 30, and the second layer 52 is preferably disposed in parallel to the mask layer 30 in a state of being in contact with the mask layer 30.

A gap may be generated between the first layer 51 alone and the mask layer 30, but the second layer 52 preferably fills the gap between the first layer 51 and the mask layer 30.

In any case, the shape of the second layer 52 is not limited, and examples thereof include shapes such as a shape in which the outline of a peripheral edge includes a plurality of straight lines orthogonal to each other as illustrated in, for example, FIG. 3, a shape in which at least two straight lines in the contour line of the peripheral edge in the above shape obliquely intersect each other, and a shape in which at least one straight line in the contour line of the peripheral edge in the above shape is curved.

As a material constituting the solid electrolyte layer 50, for example, a conductive polymer such as polypyrrole, polythiophene, and polyaniline are used. Among them, polythiophene is preferable, and poly(3,4-ethylene dioxy-thiophene) called PEDOT is particularly preferable. The conductive polymer may contain a dopant such as polysty-rene sulfonate (PSS).

Here, preferred examples of the first conductive polymer (the first main chain and the first dopant) contained in the first layer 51 and the second conductive polymer (the second main chain and the second dopant) contained in the second layer 52 will be described.

The second dopant contained in the second conductive polymer is preferably smaller in a molecular size than the first dopant contained in the first conductive polymer. Accordingly, the second conductive polymer can be more likely to be effectively dedoped than the first conductive polymer.

Here, the "molecular size" is a volume occupied by a molecular model obtained by visualizing the electron den-sity of each element constituting the dopant. The "molecular size" may be represented as a diameter when the volume occupied by the molecular model obtained by visualizing the electron density is represented by a sphere having an equiva-lent volume.

Examples of a suitable combination of the first dopant and the second dopant include the followings.

That is, the first dopant contained in the first conductive polymer may be a para-toluene sulfonate ion, and the second dopant contained in the second conductive polymer may be a sulfate ion.

The first dopant contained in the first conductive polymer may be an anthraquinone sulfonate ion, and the second dopant contained in the second conductive polymer may be a para-toluene sulfonate ion.

The first dopant contained in the first conductive polymer may be a polystyrene sulfonate ion, and the second dopant contained in the second conductive polymer may be a para-toluene sulfonate ion.

As described above, the first dopant may be molecules having more aromatic rings than the second dopant, or may be molecules having a wider conjugated system.

Regarding the ease of dedoping of such dopants and the molecular size, the dedoping is more likely to occur and the molecular size decreases in the order of the polystyrene sulfonate ion, the anthraquinone sulfonate ion, the para-toluene sulfonate ion, and the sulfate ion.

The second main chain contained in the second conduc-tive polymer may have the same skeleton as that of the first main chain contained in the first conductive polymer.

Specifically, the first main chain and the second main chain may be polythiophene, and PEDOT is particularly preferable.

On the other hand, the second main chain contained in the second conductive polymer may have a skeleton different from that of the first main chain contained in the first conductive polymer.

The first main chain contained in the first conductive polymer may be polythiophene (particularly preferably PEDOT), and the second main chain contained in the second conductive polymer may be polypyrrole or polyaniline.

The solid electrolyte layer 50 is formed by, for example, a method for forming a polymerized film of a conductive polymer such as poly(3,4-ethylene dioxythiophene) on the surface of the dielectric layer 20 using a solution containing a polymerizable monomer such as 3,4-ethylene dioxythio-phene or a method for applying a dispersion of a conductive polymer such as poly(3,4-ethylene dioxythiophene) onto the surface of the dielectric layer 20 and drying the dispersion. In particular, in the method for forming the polymerized film of the conductive polymer using the liquid containing the polymerizable monomer, as compared with the method using the dispersion of the conductive polymer, the thick-ness of the solid electrolyte layer 50 is likely to be thin on each of the corner portions 10*g* and each of the ridge portions 10*h* and 10*j* of the anode 10 or on the region of the edge of the mask layer 30, so that the leakage current can be more effectively suppressed.

The first layer 51 is preferably formed by forming an outer layer covering the entire dielectric layer 20 after forming an inner layer filling the pores (the recesses) of the valve acting metal substrate 11. The inner layer can be formed by, for example, an immersion method, sponge transfer, screen printing, dispenser application, or inkjet printing. Similarly, the outer layer can be formed by, for example, an immersion method, sponge transfer, screen printing, dispenser applica-tion, or inkjet printing. Similarly, the second layer 52 can be formed by, for example, an immersion method, sponge transfer, screen printing, dispenser application, or inkjet printing, and in the case of (1), (3), and (4) described above, the inkjet printing is preferable, and in the case of (2) described above, the immersion method is preferable.

The conductive layer 60 is provided on the solid electro-lyte layer 50. The conductive layer 60 covers approximately the entire region of the solid electrolyte layer 50 and is in contact with the mask layer 30. The conductive layer 60 may be disposed up to the front of the mask layer 30. The conductive layer 60 has a substantially constant thickness.

The conductive layer 60 includes a carbon layer or a negative conductor layer, for example. The conductive layer 60 may be a composite layer of a carbon layer and a negative conductor layer on the outer surface of the carbon layer or may be a mixed layer including carbon and negative con-ductor layer materials.

The carbon layer is formed by a method in which a carbon paste containing carbon particles and a resin is applied to the surface of the solid electrolyte layer 50 and dried, for example.

The carbon paste can be applied by, for example, an immersion method, sponge transfer, screen printing, spray coating, dispenser application, or inkjet printing.

The negative conductor layer is formed by, for example, a method in which a conductive paste containing metal particles such as gold, silver, copper, or platinum particles and a resin is applied to the surface of the solid electrolyte layer or the carbon layer and dried. The negative conductor layer is preferably a silver layer.

The conductive paste can be applied by, for example, an immersion method, sponge transfer, screen printing, spray coating, dispenser application, or inkjet printing.

[Method for Producing Electrolytic Capacitor Element]

A method for producing the electrolytic capacitor element 1 will be specifically described below. In the following example, a method for simultaneously producing a plurality of electrolytic capacitor elements using a large-sized valve acting metal substrate will be described.

Figure 16:
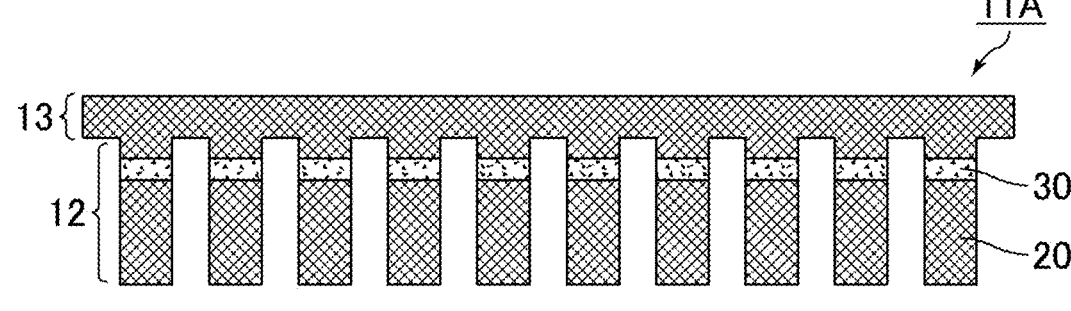
FIG. 16 is a schematic view illustrating an example of a step of preparing a valve acting metal substrate including the mask layer formed thereon.

FIG. 16 is a schematic view illustrating an example of a step of preparing the valve acting metal substrate including the mask layer.

As illustrated in FIG. 16, a valve acting metal substrate 11A having the dielectric layers 20 on its surface is prepared. The valve acting metal substrate 11A includes a plurality of element portions 12 and a support portion 13. Each of the element portions 12 has a strip shape and protrudes from the support portion 13. The mask layer 30 is formed on the dielectric layer 20 of each of the element portions 12.

First, the valve acting metal substrate 11A having a porous portion on its surface is cut by, for example, laser processing, punching, or another processing to be processed into a shape including the plurality of element portions 12 and the support portion 13.

Next, the mask layers 30 are formed on both of the main faces and both of the side faces of the element portions 12 along the short side of each of the element portions 12.

Thereafter, the valve acting metal substrate 11A is anodized to form oxide films to be the dielectric layers 20 on the surface of the valve acting metal substrate 11A. At this time, an oxide film is also formed on the side face of each of the element portions 12 cut by laser processing, punching, or another processing. Here, a chemical conversion foil on which an oxide of the valve acting metal is already formed may be used as the valve acting metal substrate 11A. Also in this case, the valve acting metal substrate 11A after cutting is anodized to form an oxide film on the side face of the cut element portion 12.

Figure 17:
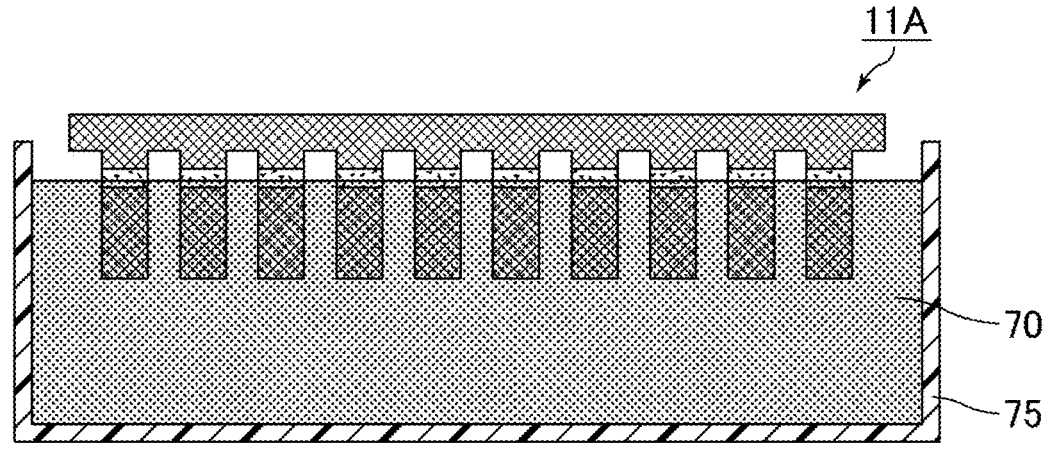
FIG. 17 is a schematic view illustrating an example of a step of forming a first layer of a solid electrolyte layer.

FIG. 17 is a schematic view illustrating an example of a step of forming the first layer of the solid electrolyte layer.

The first layer 51 of the solid electrolyte layer 50 (refer to, for example, FIG. 3) is formed on the dielectric layer 20 of the element portion 12. As illustrated in FIG. 17, a treatment liquid for forming a first conductive polymer is preferably applied to the valve acting metal substrate 11A by an immersion method. FIG. 17 illustrates a state of supplying a treatment liquid 70 for forming a first conductive polymer to a treatment tank 75.

As the treatment liquid 70 for forming a first conductive polymer, for example, a dispersion of the first conductive polymer is used. A conductive polymer film can be formed by attaching the dispersion of the first conductive polymer to the outer surface of the dielectric layer 20 and drying the dispersion. Alternatively, as the treatment liquid 70 for forming a first conductive polymer, a solution containing a polymerizable monomer, for example, 3,4-ethylene dioxythiophene, and an oxidizing agent, for example, iron (III) para-toluene sulfonate, may be used. A conductive polymer film can be formed by chemical polymerization after attaching the solution containing the polymerizable monomer to the outer surface of the dielectric layer 20. This conductive polymer film becomes the first layer 51 of the solid electrolyte layer 50.

As illustrated in FIG. 17, the porous portion of the valve acting metal substrate 11A is impregnated with the treatment liquid 70 by immersing the valve acting metal substrate 11A in the treatment liquid 70. After immersion for a predetermined time, the valve acting metal substrate 11A is pulled up from the treatment liquid 70 and dried at a predetermined temperature for a predetermined time. The first layer 51 of the solid electrolyte layer 50 is formed by repeating immersion in the treatment liquid 70, pulling up, and drying a predetermined number of times.

For example, the valve acting metal substrate 11A is immersed in a first dispersion containing the first conductive polymer (which may be the solution containing the polymerizable monomer), pulled up, and then, dried to form the inner layer (a portion provided on the dielectric layer 20 and filling the pores of the valve acting metal substrate 11) of the first layer 51. The immersion in the first dispersion, pulling up, and drying may be performed multiple times.

After the inner layer of the first layer 51 is formed, the valve acting metal substrate 11A may be immersed in a solution containing a primer compound, pulled up, and dried to form a primer layer.

Thereafter, the valve acting metal substrate 11A is immersed in a second dispersion including the first conductive polymer (which may be the solution containing the polymerizable monomer), pulled up, and dried to form the outer layer (a portion connected to the inner layer and covering the entire dielectric layer 20) of the first layer 51.

In a case where the primer layer is formed, the valve acting metal substrate 11A is washed with pure water to remove an excessive primer compound. After washing, a drying treatment is performed. Accordingly, the first layer 51 of the solid electrolyte layer 50 is formed in a predetermined region.

Figure 18:
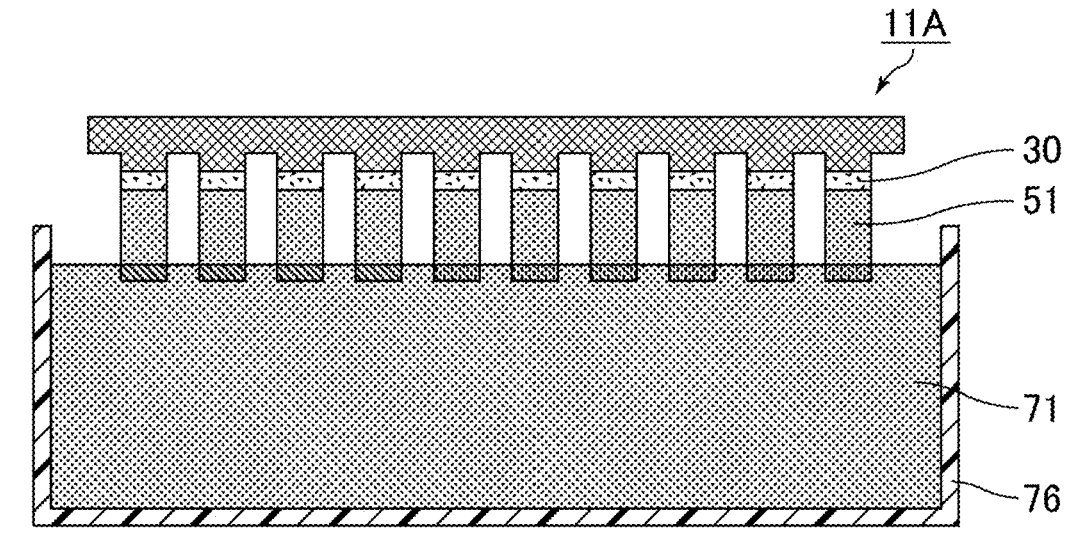
FIG. 18 is a schematic view illustrating an example of a step of forming a second layer of the solid electrolyte layer.

FIG. 18 is a schematic view illustrating an example of a step of forming the second layer of the solid electrolyte layer.

After the first layer 51 of the solid electrolyte layer 50 is formed, for example, as illustrated in FIG. 18, a treatment liquid for forming a second conductive polymer is applied to a region where the second layer 52 (refer to, for example, FIG. 6) is to be formed by an immersion method. FIG. 18 illustrates a state of supplying a treatment liquid 71 for forming a second conductive polymer to a treatment tank 76.

As the treatment liquid 71 for forming a second conductive polymer, for example, a dispersion of the second conductive polymer is used. A conductive polymer film can be formed by attaching the dispersion of the second conductive polymer to the outer surface of the first layer 51 and drying the dispersion. Alternatively, as the treatment liquid 71 for forming a second conductive polymer, a solution containing a polymerizable monomer, for example, 3,4-ethylene dioxythiophene, and an oxidizing agent, for example, iron (III) para-toluene sulfonate, may be used. A conductive polymer film can be formed by chemical polymerization after attaching the solution containing the polymerizable monomer to the outer surface of the first layer 51. This conductive polymer film becomes the second layer 52 of the solid electrolyte layer 50.

As illustrated in FIG. 18, the front end portion of the valve acting metal substrate 11A is immersed in the treatment liquid 71, so that the treatment liquid 71 is attached to the outer surface of the first layer 51. After immersion for a predetermined time, the valve acting metal substrate 11A is pulled up from the treatment liquid 71 and dried at a predetermined temperature for a predetermined time. The second layer 52 of the solid electrolyte layer 50, as illustrated in FIG. 6, is formed by repeating immersion in the treatment liquid 71, pulling up, and drying a predetermined number of times.

Instead of such a method, the treatment liquid for forming a second conductive polymer (for example, the dispersion of the second conductive polymer or the solution containing the polymerizable monomer and the oxidizing agent) may be discharged to the outer surface of the first layer 51 by inkjet printing to form the second layer 52 of the solid electrolyte layer 50 in a predetermined region. Accordingly, the second layer 52 of the solid electrolyte layer 50 as illustrated in FIG. 3, FIG. 9, and FIG. 12 can be formed.

After the solid electrolyte layer 50 is formed, the valve acting metal substrate 11A is immersed in a carbon paste, pulled up, and dried to form a carbon layer in a predetermined region.

After the carbon layer is formed, the valve acting metal substrate 11A is immersed in a conductive paste containing metal particles, such as a silver paste, pulled up, and dried to form a negative conductor layer in a predetermined region.

The element portion 12 is separated by cutting the valve acting metal substrate 11A, and a strip-shaped anode 10 having a cross-section corresponding to that of the base end face 10b is formed.

The electrolytic capacitor element 1 can be obtained through the above-described steps.

[Electrolytic Capacitor]

Hereinafter, an example of an electrolytic capacitor including the solid electrolytic capacitor element of the present description will be described. The electrolytic capacitor element of the present description may be included in an electrolytic capacitor having another structure. For example, a lead frame may be used as an external electrode. The electrolytic capacitor may include an electrolytic capacitor element other than the electrolytic capacitor element of the present description (that is, an electrolytic capacitor element having a structure different from the structure of the electrolytic capacitor element of the present description).

Figure 19:
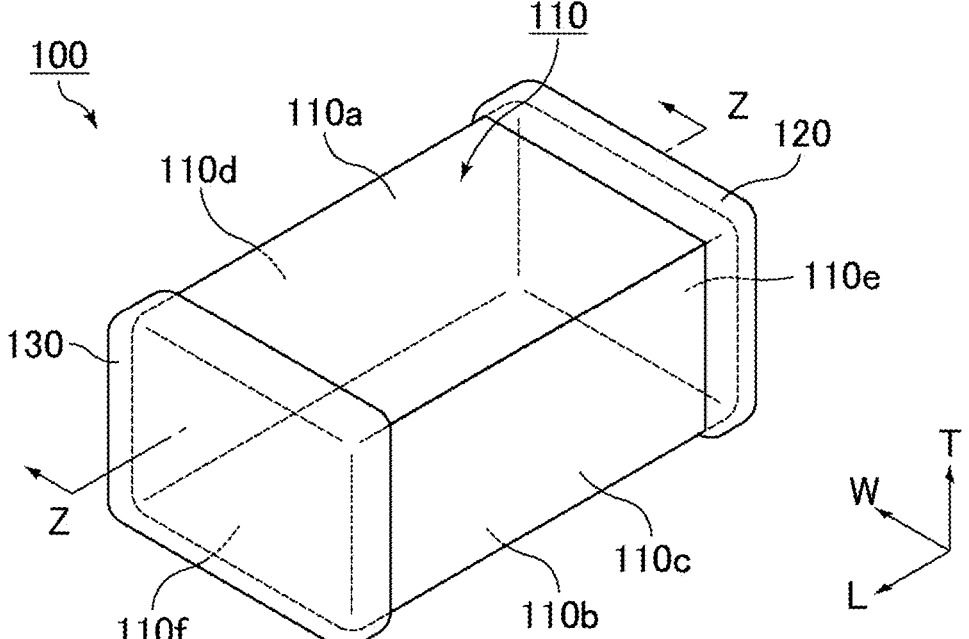
FIG. 19 is a perspective view schematically illustrating an example of an electrolytic capacitor including the electrolytic capacitor element according to the embodiment of the present description.
Figure 20:
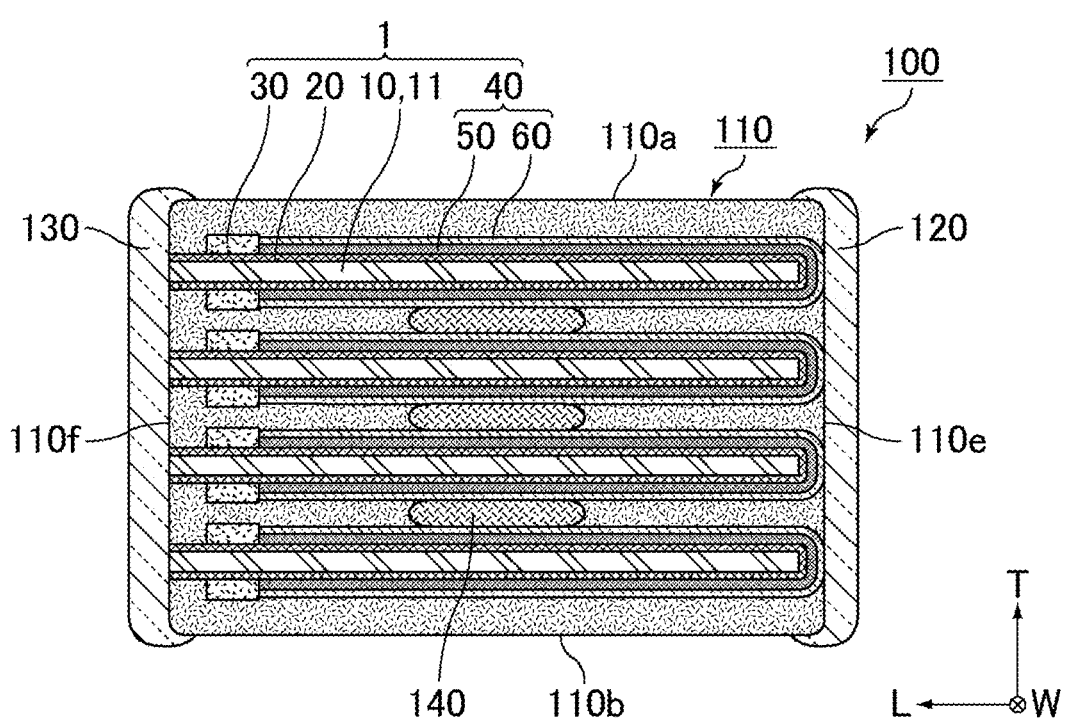
FIG. 20 is a cross-sectional view taken along line Z-Z of the electrolytic capacitor illustrated in FIG. 19.

FIG. 19 is a perspective view schematically illustrating an example of the electrolytic capacitor including the electrolytic capacitor element according to the embodiment of the present description. FIG. 20 is a cross-sectional view taken along line Z-Z of the electrolytic capacitor illustrated in FIG. 19.

In FIG. 19 and FIG. 20, the length direction, the width direction, and the height direction of an electrolytic capacitor 100 and an exterior body 110 are indicated by L, W, and T, respectively. Here, the length direction L, the width direction W, and the height direction T are orthogonal to each other.

As illustrated in FIG. 19 and FIG. 20, the electrolytic capacitor 100 has a substantially rectangular parallelepiped outer shape. The electrolytic capacitor 100 is a solid electrolytic capacitor, and includes the exterior body 110, a first external electrode 120, a second external electrode 130, and a plurality of electrolytic capacitor elements 1.

The exterior body 110 seals the plurality of electrolytic capacitor elements 1. In other words, the plurality of electrolytic capacitor elements 1 are embedded in the exterior body 110. The exterior body 110 may seal one electrolytic capacitor element 1. In other words, one electrolytic capacitor element 1 may be embedded in the exterior body 110.

The exterior body 110 has a substantially rectangular parallelepiped outer shape. The exterior body 110 has a first main face 110a and a second main face 110b facing each other in the height direction T, a first side face 110c and a second side face 110d facing each other in the width direction W, and a first end face 110e and a second end face 110f facing each other in the length direction L.

As described above, although the exterior body 110 has a substantially rectangular parallelepiped outer shape, preferably, corner portions and ridge portions are rounded.

The exterior body 110 is made of, for example, a sealing resin.

The sealing resin includes at least a resin, and preferably contains a resin and a filler.

As the resin, for example, an epoxy resin, a phenol resin, a polyimide resin, a silicone resin, a polyamide resin, or a liquid crystal polymer is preferably used.

As the filler, for example, silica particles, or alumina particles are preferably used.

As the sealing resin, a material containing a solid epoxy resin, a phenol resin, and silica particles is preferably used.

When a solid sealing resin is used, a resin mold such as a compression mold or a transfer mold is preferably used, and a compression mold is more preferably used. When a liquid sealing resin is used, a molding method such as a dispensing method or a printing method is preferably used. Among them, the exterior body 110 is preferably formed by sealing the periphery of the electrolytic capacitor element 1 with the sealing resin by compression molding.

The exterior body 110 may include a substrate and the sealing resin provided on the substrate. The substrate is, for example, an insulating resin substrate such as a glass epoxy substrate. In this case, the bottom face of the substrate defines the second main face 110b of the exterior body 110. The thickness of the substrate is, for example, 100 μm.

The plurality of electrolytic capacitor elements 1 are stacked via a conductive adhesive 140 in the height direction T. The extending direction of each of the plurality of electrolytic capacitor elements 1 is substantially parallel to the first main face 110a and the second main face 110b of the exterior body 110. The electrolytic capacitor elements 1 are bonded to each other with the conductive adhesive 140 interposed therebetween.

The conductive adhesive 140 includes metal particles such as gold, silver, copper, or platinum particles and a resin, and here, the metal particles used are silver particles, and the resin used is an acrylic resin.

Other examples of the resin contained in the conductive adhesive 140 include urethane resins, epoxy resins, polyimide resins, and phenol resins.

The first external electrode 120 is provided on the first end face 110e of the exterior body 110. In FIG. 19, the first external electrode 120 is provided from the first end face 110e to the first main face 110a, the second main face 110b, the first side face 110c, and the second side face 110d of the exterior body 110. The first external electrode 120 is electrically connected to the conductive layer 60 of the cathode 40 in the electrolytic capacitor element 1, in which the conductive layer 60 is exposed from the exterior body 110 in the first end face 110e. The first external electrode 120 may be directly or indirectly connected to the conductive layer 60 in the first end face 110e of the exterior body 110.

The second external electrode 130 is provided on the second end face 110f of the exterior body 110. In FIG. 19, the second external electrode 130 is provided from the second end face 110f to the first main face 110a, the second main face 110b, the first side face 110c, and the second side face 110d of the exterior body 110. The second external electrode 130 is electrically connected to the anode 10 (the valve acting metal substrate 11) of the electrolytic capacitor element 1, in which the anode 10 is exposed from the exterior body 110 in the second end face 110f. The second external electrode 130 may be directly or indirectly connected to the anode 10 (the valve acting metal substrate 11) in the second end face 110f of the exterior body 110.

Each of the first external electrode 120 and the second external electrode 130 is preferably formed by at least one method selected from the group consisting of a dip coating method, a screen printing method, a transfer method, an inkjet printing method, a dispensing method, a spray coating method, a brush coating method, a drop casting method, an electrostatic coating method, a plating method, and a sputtering method.

The first external electrode 120 preferably has a resin electrode layer including a conductive component and a resin component. When the first external electrode 120 includes a resin component, adhesion between the first external electrode 120 and the sealing resin of the exterior body 110 is enhanced, so that reliability is improved.

The second external electrode 130 preferably has a resin electrode layer including a conductive component and a resin component. When the second external electrode 130 includes a resin component, adhesion between the second external electrode 130 and the sealing resin of the exterior body 110 is enhanced, so that the reliability is improved.

The conductive component preferably contains, as a main component, for example, a simple metal such as silver, copper, nickel, or tin, or an alloy containing at least one of these metals.

The resin component preferably contains, for example, an epoxy resin, or a phenol resin as a main component.

The resin electrode layer is formed by, for example, a method such as a dip coating method, a screen printing method, a transfer method, an inkjet printing method, a dispensing method, a spray coating method, a brush coating method, a drop casting method, or an electrostatic coating method. Among them, the resin electrode layer is preferably a printed resin electrode layer formed by applying a conductive paste by a screen printing method. When the resin electrode layer is formed by applying a conductive paste by a screen printing method, the first external electrode 120 and the second external electrode 130 tend to be flat as compared to the case where the resin electrode layer is formed by applying the conductive paste by a dip coating method. In other words, the thicknesses of the first external electrode 120 and the second external electrode 130 tend to be uniform.

When the first external electrode 120 has a resin electrode layer, the first external electrode 120 and the negative conductor layer include a resin component, thereby improving the adhesion between the first external electrode 120 and the negative conductor layer, and improving the reliability.

At least one of the first external electrode 120 or the second external electrode 130 may have what is called a plating layer formed by a plating method. Examples of the plating layer include a zinc-silver-nickel layer, a silver-nickel layer, a nickel layer, a zinc-nickel-gold layer, a nickel-gold layer, a zinc-nickel-copper layer, and a nickel-copper layer. For example, on one of these plating layers, a copper plating layer, a nickel plating layer, and a tin plating layer are preferably provided in this order (alternatively, except for at least one plating layer).

At least one of the first external electrode 120 or the second external electrode 130 may have both a resin electrode layer and a plating layer. For example, the second external electrode 130 may have a resin electrode layer connected to the anode 10 (the valve acting metal substrate 11) and an outer layer plating layer provided on the surface of the resin electrode layer. The second external electrode 130 may include an inner layer plating layer connected to the anode 10 (the valve acting metal substrate 11), a resin electrode layer provided so as to cover the inner layer plating layer, and an outer layer plating layer provided on the surface of the resin electrode layer.

In the above embodiment, the case where the second layer 52 is formed on the first layer 51 after forming the first layer 51 has been described, but the first layer 51 may be formed on the second layer 52 after forming the second layer 52. In this case, similarly to the first layer 51, the second layer 52 is also preferably formed by forming an inner layer (a portion provided on the dielectric layer 20 and filling the pores of the valve acting metal substrate 11) and then forming an outer layer (a portion connected to the inner layer and covering the entire dielectric layer 20 in the region).

In the above embodiment, the case where the first layer 51 is disposed in the entire plane of the solid electrolyte layer 50 has been described, but the first layer 51 may be partially disposed in the plane of the solid electrolyte layer 50. That is, the first layer 51 may be selectively disposed only in a region where the second layer 52 is not disposed in the plane of the solid electrolyte layer 50. In this case, inkjet printing is preferable as a method for forming the first layer 51.

In the above embodiment, the case where the electrolytic capacitor element 1 is the solid electrolytic capacitor using the conductive polymer as an electrolyte material has been described, but the electrolytic capacitor element of the present description may be a so-called hybrid electrolytic capacitor element using an electrolytic solution in addition to a solid electrolyte such as a conductive polymer as an electrolyte material.

In the above embodiment, the case where the electrolytic capacitor element 1 is used for the chip-type electrolytic capacitor 100 has been described, but the electrolytic capacitor element of the present description may be used by being embedded in a package substrate included in a semiconductor device, for example. Here, examples of the semiconductor device include a semiconductor composite device in which a voltage regulator (a voltage control device) and a load are mounted on a package board.

EXAMPLES

Hereinafter, examples in which the electrolytic capacitor element of the present description is disclosed in more detail will be described. The present description is not limited only to these examples.

Example 1

An aluminum foil with an etched layer on its surface was prepared as an anode (a valve acting metal substrate), and the aluminum foil was anodized by being immersed in an aqueous ammonium adipate solution to form a dielectric layer on the surface of the aluminum foil.

Subsequently, a composition of a soluble polyimide siloxane and an epoxy resin was transferred by a roller to the aluminum foil with the dielectric layer on its surface to form a mask layer on both main faces and both side faces of the aluminum foil via the dielectric layer.

The aluminum foil was immersed in a solution mixture of iron (III) para-toluene sulfonate, 3,4-ethylene dioxythiophene, and 1-butanol to just below the mask layer, pulled up, and dried. As a result, 3,4-ethylene dioxythiophene was chemically polymerized on the dielectric layer to form a first layer of a solid electrolyte layer on the dielectric layer. A first main chain of the first layer was poly(3,4-ethylene dioxythiophene), and a first dopant of the first layer was a para-toluene sulfonate ion. The para-toluene sulfonate ion is incorporated into the first layer from iron (III) para-toluene sulfonate, which is an oxidizing agent used in a chemical polymerization reaction, to form the first dopant.

Next, only the front end portion (the lower end portion) of the aluminum foil was immersed in an aqueous ammonium persulfate solution, pulled up, immersed in a solution mixture of 3,4-ethylene dioxythiophene and ethanol, pulled up, and dried to partially form a second layer of the solid electrolyte layer on the first layer (refer to FIG. 6). A second main chain of the second layer was poly(3,4-ethylene dioxythiophene), and a second dopant of the second layer was a sulfate ion. The sulfate ion from ammonium persulfate is the second dopant.

Next, a carbon layer and a silver layer were sequentially formed to obtain an electrolytic capacitor element.

Four pieces of the obtained electrolytic capacitor element were stacked using a conductive adhesive to obtain a stack. Subsequently, the stack was sealed with an epoxy resin and then singulated using a dicer. A silver paste containing a resin component was screen printed on the cathode side end face and the anode side end face of the singulated sealed body to form external electrodes on the cathode and the anode, and a finished electrolytic capacitor was obtained.

Example 2

A finished electrolytic capacitor was obtained as in Example 1, except that a solid electrolyte layer was formed as follows.

That is, an aluminum foil with a dielectric layer on its surface was immersed in an aqueous dispersion of poly(3, 4-ethylene dioxythiophene) and polystyrene sulfonate, pulled up, and dried to form a first layer of the solid electrolyte layer on the dielectric layer. A first main chain of the first layer was poly(3,4-ethylene dioxythiophene), and a first dopant of the first layer was a polystyrene sulfonate ion.

Next, only the front end portion (the lower end portion) of the aluminum foil was immersed in a solution mixture of iron (III) para-toluene sulfonate, 3,4-ethylene dioxythiophene, and 1-butanol, pulled up, and then dried. Accordingly, 3,4-ethylene dioxythiophene was chemically polymerized on the first layer to partially form a second layer of the solid electrolyte layer on the first layer (refer to FIG. 6). A second main chain of the second layer was poly(3,4-ethylene dioxythiophene), and a second dopant of the second layer was a para-toluene sulfonate ion. As in the case of the first layer, the para-toluene sulfonate ion is incorporated into the second layer from iron (III) para-toluene sulfonate, which is an oxidant used in a chemical polymerization reaction, to form the second dopant.

Example 3

A finished electrolytic capacitor was obtained as in Example 1, except that a solid electrolyte layer was formed as follows.

That is, an aluminum foil with a dielectric layer on its surface was immersed in an aqueous dispersion of poly(3, 4-ethylene dioxythiophene) and polystyrene sulfonate, pulled up, and dried to form a first layer of the solid electrolyte layer on the dielectric layer. A first main chain of the first layer was poly(3,4-ethylene dioxythiophene), and a first dopant of the first layer was a polystyrene sulfonate ion.

Next, an N-methyl-2 pyrrolidone (NMP) solution of polyaniline not containing a second dopant was applied only to each corner portion on the front end face side (the lower end side) of the aluminum foil by inkjet printing, and dried to partially form a second layer of the solid electrolyte layer on the first layer (refer to FIG. 3). The second layer was doped with the second dopant by being immersed in an aqueous sodium para-toluene sulfonate solution. A second main chain of the second layer was polyaniline, and the second dopant of the second layer was a para-toluene sulfonate ion.

Example 4

A finished electrolytic capacitor was obtained as in Example 1, except that a solid electrolyte layer was formed as follows.

That is, an aluminum foil with a dielectric layer on its surface was immersed in an aqueous dispersion of poly(3, 4-ethylene dioxythiophene) and polystyrene sulfonate, pulled up, and dried to form a first layer of the solid electrolyte layer on the dielectric layer. A first main chain of the first layer was poly(3,4-ethylene dioxythiophene), and a first dopant of the first layer was a polystyrene sulfonate ion.

Next, an N-methyl-2 pyrrolidone (NMP) solution of polyaniline not containing a second dopant was applied to the front end face (the lower end face), each side face, each corner portion, and each ridge portion of the aluminum foil by inkjet printing, and dried to partially form a second layer of the solid electrolyte layer on the first layer (refer to FIG. 9). The second layer was doped with the second dopant by being immersed in an aqueous sodium para-toluene sulfonate solution. A second main chain of the second layer was polyaniline, and the second dopant of the second layer was a para-toluene sulfonate ion.

Comparative Example 1

A finished electrolytic capacitor was obtained as in Example 1, except that a solid electrolyte layer was formed as follows.

That is, an aluminum foil with a dielectric layer on its surface was immersed in a solution mixture of iron (III) para-toluene sulfonate, 3,4-ethylene dioxythiophene, and 1-butanol, pulled up, and dried to form a first layer of the solid electrolyte layer on the dielectric layer. A first main chain of the first layer was poly(3,4-ethylene dioxythiophene), and a first dopant of the first layer was a para-toluene sulfonate ion. A second layer of the solid electrolyte layer was not formed.

Comparative Example 2

A finished electrolytic capacitor was obtained as in Example 1, except that a solid electrolyte layer was formed as follows.

That is, an aluminum foil with a dielectric layer on its surface was immersed in a solution mixture of iron (III) para-toluene sulfonate, 3,4-ethylene dioxythiophene, and 1-butanol, pulled up, and dried to form a first layer of the solid electrolyte layer on the dielectric layer. A first main chain of the first layer was poly(3,4-ethylene dioxythiophene), and a first dopant of the first layer was a para-toluene sulfonate ion.

Next, the aluminum foil was immersed in an aqueous ammonium persulfate solution so as to cover the entire first layer, pulled up, and immersed in a solution mixture of 3,4-ethylene dioxythiophene and ethanol, pulled up, and dried to form a second layer of the solid electrolyte layer over the entire region on the first layer. A second main chain of the second layer was poly(3,4-ethylene dioxythiophene), and a second dopant of the second layer was a sulfate ion.

Comparative Example 3

A finished electrolytic capacitor was obtained as in Example 1, except that a solid electrolyte layer was formed as follows.

That is, an aluminum foil with a dielectric layer on its surface was immersed in an aqueous dispersion of poly(3, 4-ethylene dioxythiophene) and polystyrene sulfonate, pulled up, and dried to form a first layer of the solid electrolyte layer on the dielectric layer. A first main chain of the first layer was poly(3,4-ethylene dioxythiophene), and a first dopant of the first layer was a polystyrene sulfonate ion. A second layer of the solid electrolyte layer was not formed.

Comparative Example 4

A finished electrolytic capacitor was obtained as in Example 1, except that a solid electrolyte layer was formed as follows.

That is, an aluminum foil with a dielectric layer on its surface was immersed in an aqueous dispersion of poly(3, 4-ethylene dioxythiophene) and polystyrene sulfonate, pulled up, and dried to form a first layer of the solid electrolyte layer on the dielectric layer. A first main chain of the first layer was poly(3,4-ethylene dioxythiophene), and a first dopant of the first layer was a polystyrene sulfonate ion.

Next, the aluminum foil was immersed in an N-methyl-2 pyrrolidone (NMP) solution of polyaniline so as to cover the entire first layer, pulled up, and dried to form a second layer of the solid electrolyte layer over the entire region on the first layer. A second main chain of the second layer was polyaniline, and the second dopant of the second layer was a para-toluene sulfonate ion.

For the electrolytic capacitors obtained in Examples 1 to 4 and Comparative Examples 1 to 4, the equivalent series resistance (ESR) and the leakage current (LC) non-defective rate of the finished electrolytic capacitors were evaluated. The results are shown in Table 1 below.

ESR indicates a relative value with respect to ESR of the electrolytic capacitor obtained in Comparative Example 1.

TABLE 1

|  | ESR (relative value) | LC non-defective rate |
|---|---|---|
| Example 1 | 103 | 96% |
| Example 2 | 115 | 97% |
| Example 3 | 120 | 98% |
| Example 4 | 130 | 99% |
| Comparative Example 1 | 100 | 80% |
| Comparative Example 2 | 170 | 99% |
| Comparative Example 3 | 110 | 85% |
| Comparative Example 4 | 200 | 99% |

In Example 1, since the second layer of the solid electrolyte layer covering the front end portion (including each corner portion) of the aluminum foil is doped with the sulfate ion that is likely to be dedoped, the LC non-defective rate is improved compared to Comparative Example 1. In Example 1, only a part of the solid electrolyte layer was formed with a conductive polymer which is likely to be dedoped, so that it was possible to reduce an increase in ESR compared to Comparative Example 2.

For other examples, the second layer of the solid electrolyte layer selectively covering only a location where the leakage current is likely to occur, such as each corner portion of the front end portion of the aluminum foil, is doped with the dopant that is likely to be dedoped, so that a high LC non-defective rate is attained while suppressing an increase in ESR.

REFERENCE SIGNS LIST 1 electrolytic capacitor element
10 anode 10a front end face
10b base end face
10c, 10d main face
10e, 10f side face
10g corner portion
10h, 10ha, 10j ridge portion
11, 11A valve acting metal substrate
12 element portion
13 support portion
20 dielectric layer
30 mask layer
40 cathode
50 solid electrolyte layer
51 first layer
52 second layer
60 conductive layer
70, 71 treatment liquid
75, 76 treatment tank
100 solid electrolytic capacitor
110 exterior body
110a first main face
110b second main face
110c first side face
110d second side face
110e first end face
110f second end face
120 first external electrode
130 second external electrode
140 conductive adhesive

The invention claimed is:

1. An electrolytic capacitor element comprising:
an anode including a valve acting metal substrate and having a front end face and a base end face;
a dielectric layer on at least one main face of the anode but excluding at least the base end face;
a mask layer including an insulating material on the dielectric layer adjacent the base end face; and
a cathode on the dielectric layer on the front end face side from the mask layer,
the cathode including a solid electrolyte layer on the dielectric layer and a conductive layer on the solid electrolyte layer,
the solid electrolyte layer including a first layer including a first conductive polymer doped with a first dopant and a second layer including a second conductive polymer doped with a second dopant,
the second layer being partially disposed in a plane of the solid electrolyte layer,
the first layer being disposed at least in a region in which the second layer is not disposed in the plane of the solid electrolyte layer, and
the second conductive polymer being more likely to be dedoped than the first conductive polymer.

2. The electrolytic capacitor element according to claim 1, wherein
the anode includes six faces of the front end face, the base end face, a pair of main faces, and a pair of side faces, and includes a corner portion in which three faces of the six faces intersect each other, and a ridge portion in which two faces of the six faces intersect each other, and
the second layer covers a corner portion formed by the front end face.

3. The electrolytic capacitor element according to claim 2, wherein the second layer further covers the front end face and a ridge portion formed by the front end face.

4. The electrolytic capacitor element according to claim 3, wherein the second layer further covers each of the side faces and a ridge portion formed by each of the side faces.

5. The electrolytic capacitor element according to claim 2, wherein the second layer further covers each of the side faces and a ridge portion formed by each of the side faces.

6. The electrolytic capacitor element according to claim 1, wherein the second layer is disposed along the mask layer.

7. The electrolytic capacitor element according to claim 1, wherein the anode includes six faces of the front end face, the base end face, a pair of main faces, and a pair of side faces, and the first layer covers the pair of main faces and the pair of side faces.

8. The electrolytic capacitor element according to claim 1, wherein the second dopant contained in the second conductive polymer has a smaller molecular size than the first dopant contained in the first conductive polymer.

9. The electrolytic capacitor element according to claim 1, wherein the first dopant contained in the first conductive polymer is a para-toluene sulfonate ion, and the second dopant contained in the second conductive polymer is a sulfate ion.

10. The electrolytic capacitor element according to claim 1, wherein the first dopant contained in the first conductive polymer is an anthraquinone sulfonate ion, and the second dopant contained in the second conductive polymer is a para-toluene sulfonate ion.

11. The electrolytic capacitor element according to claim 1, wherein the first dopant contained in the first conductive polymer is a polystyrene sulfonate ion, and the second dopant contained in the second conductive polymer is a para-toluene sulfonate ion.

12. The electrolytic capacitor element according to claim 1, wherein a second main chain contained in the second conductive polymer has a same skeleton as a first main chain contained in the first conductive polymer.

13. The electrolytic capacitor element according to claim 12, wherein the first main chain and the second main chain are polythiophene.

14. The electrolytic capacitor element according to claim 1, wherein a second main chain contained in the second conductive polymer has a different skeleton from a first main chain contained in the first conductive polymer.

15. The electrolytic capacitor element according to claim 1, wherein a first main chain contained in the first conductive polymer is polythiophene, and a second main chain contained in the second conductive polymer is polypyrrole or polyaniline.

* * * * *